Aug. 31, 1965  E. H. SHARP  3,203,361
RESILIENTLY SUSPENDED TRANSPORT STRUCTURE
Filed Aug. 25, 1961  3 Sheets-Sheet 1
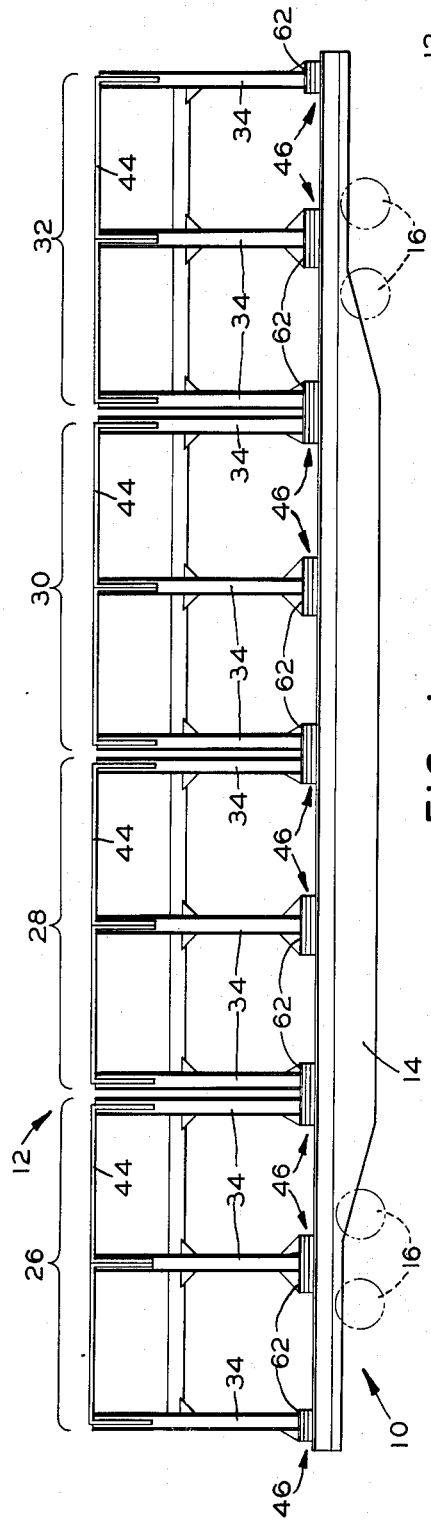
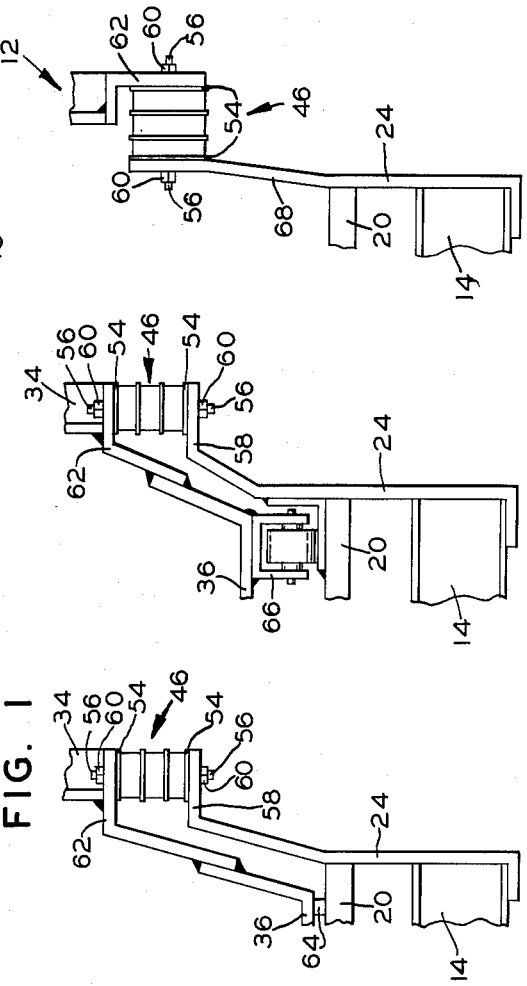
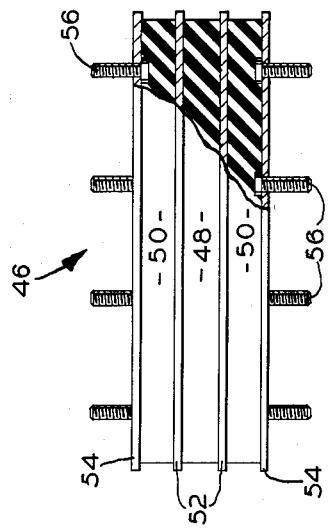

United States Patent Office 3,203,361
Patented Aug. 31, 1965

3,203,361
RESILIENTLY SUSPENDED TRANSPORT
STRUCTURE
Everett H. Sharp, Lambertville, Mich., assignor to Dana
Corporation, Toledo, Ohio, a corporation of Virginia
Filed Aug. 25, 1961, Ser. No. 133,909
2 Claims. (Cl. 105—368)

This invention relates to transport structures in general, and is particularly directed to a device wherein a cargo carrying superstructure is yieldingly mounted on a cargo carrier to minimize shock and damage to the superstructure and to the cargo carried thereby.

In shipping cargo, it is necessary to provide a structure for holding the same on the carrier; and such structure, in view of the detrimental shock or impact loadings encountered with almost every type of cargo carrier, should incorporate means for protecting the cargo from damage. If the cargo consists of a plurality of items, it is the usual practice to provide a superstructure on the carrier to accommodate the plurality of items; the items being secured to the superstructure.

Consequently, either the means securing the cargo to the superstructure, or the means attaching the superstructure to the cargo carrier itself, should be adapted to protect the cargo against shock loads. The latter method is preferred, for by incorporating the cargo protection in the means attaching the superstructure to the carrier, the superstructure is also protected from damage due to shock loads; and further, inexpensive rigid tie-down devices can be used to secure the cargo to the superstructure.

An example of the shock loads discussed above, are those encountered in a railway car cargo carrier. Severe shock loads arise during coupling of the cars since this is accomplished by impact; furthermore, many shock loads from a multitude of conditions arise during the transportation of the cargo by the railway car. These loads have longitudinal, lateral, and vertical components, all of which must be cushioned and dampened to afford proper protection to the cargo.

Several prior art structures, exemplified by Patent No. 1,940,953, have disclosed providing a yielding connection between the superstructure and the carrier so that longitudinal movement therebetween is dampened by compression of a resilient cushion means. However, when resilient cushions are loaded in compression they become highly compacted after a relatively small deflection and do not adequately cushion the superstructure. Furthermore, the multitude of load components which may occur simultaneously with the longitudinal load are inadequately cushioned. For example, in prior constructions, the superstructure is not cushionly supported on the carrier against vertical juggling but directly engages the same so that a certain amount of friction arises upon relative movement thereof which friction inhibits the dampening and cushioning effect of the resilient connection and, in addition, interferes with the recentering of the movable members upon termination of the load which caused the original relative movement.

It is, therefore, an object of this invention to provide a device including a superstructure mounted on a cargo carrier wherein impact loads to the superstructure are adequately cushioned.

It is another object of this invention to provide a superstructure mounted on a cargo carrier wherein the mounting means includes resilient means acting in shear to cushion longitudinal shock loads.

It is yet another object of this invention to provide a superstructure mounted by resilient means on a cargo carrier wherein said resilient means will cushion vertical loads, in addition to longitudinal loads.

It is still another object of this invention to provide cushion mounts for a superstructure at a plurality of points to more uniformly cushion the superstructure.

It is yet a further object of this invention to provide a device wherein a superstructure is movably mounted on a cargo carrier by resilient means which will accommodate the relative components of movement therebetween in two directions by acting in shear so that shock loads to the superstructure are cushioned.

Further objects and advantages will become apparent upon reading the following specification together with the accompanying drawings which form a part thereof.

In the drawings:

FIG. 1 is a side elevational view of a device embodying this invention which includes a railway car having an auto transport superstructure mounted thereon.

FIG. 4 is an enlarged elevational view partly in section of the cushioning element of this invention.

FIGS. 5, 6 and 7 are enlarged end elevational views of a portion of a railway car and superstructure showing further embodiments of this invention.

In a preferred embodiment of this invention, a cargo carrier having a frame is provided with a suitable superstructure mounted thereon. The mounting means takes the form of a plurality of cushion members having a rubber, rubber-like, or other suitable elastomeric material incorporated therein which interconnects the frame and the superstructure whereby relative movement therebetween is accommodated by deformation of the cushioning members. Preferably, the cushion is disposed so that longitudinal relative components of movement between the carrier and the superstructure, which normally produces the greatest shock loads, will induce shear type deformation of the cushions; the relative components of movement in other directions inducing shear, tensile, or compressive type deformation of the cushions as the case may be. A great advantage is obtained by using a resilient cushion positioned so that it will deform in shear when subjected to the most severe loads. More particularly, when a resilient cushion is deformed in tension, for a given deflection experience has revealed that the cushion is subjected to a load of much greater magnitude (approximately three times) than the load in shear. Further, when resilient cushions are loaded in compression, they become highly compacted after a relatively small deflection. Therefore, to accommodate the same deflection in compression or tension as can be accommodated in shear, a larger resilient cushion is required.

While this invention is applicable to other types of cargo carriers and superstructures in general, it is particularly adapted to a carrier of the railway car type and a vehicle transporting superstructure.

Figure 2:
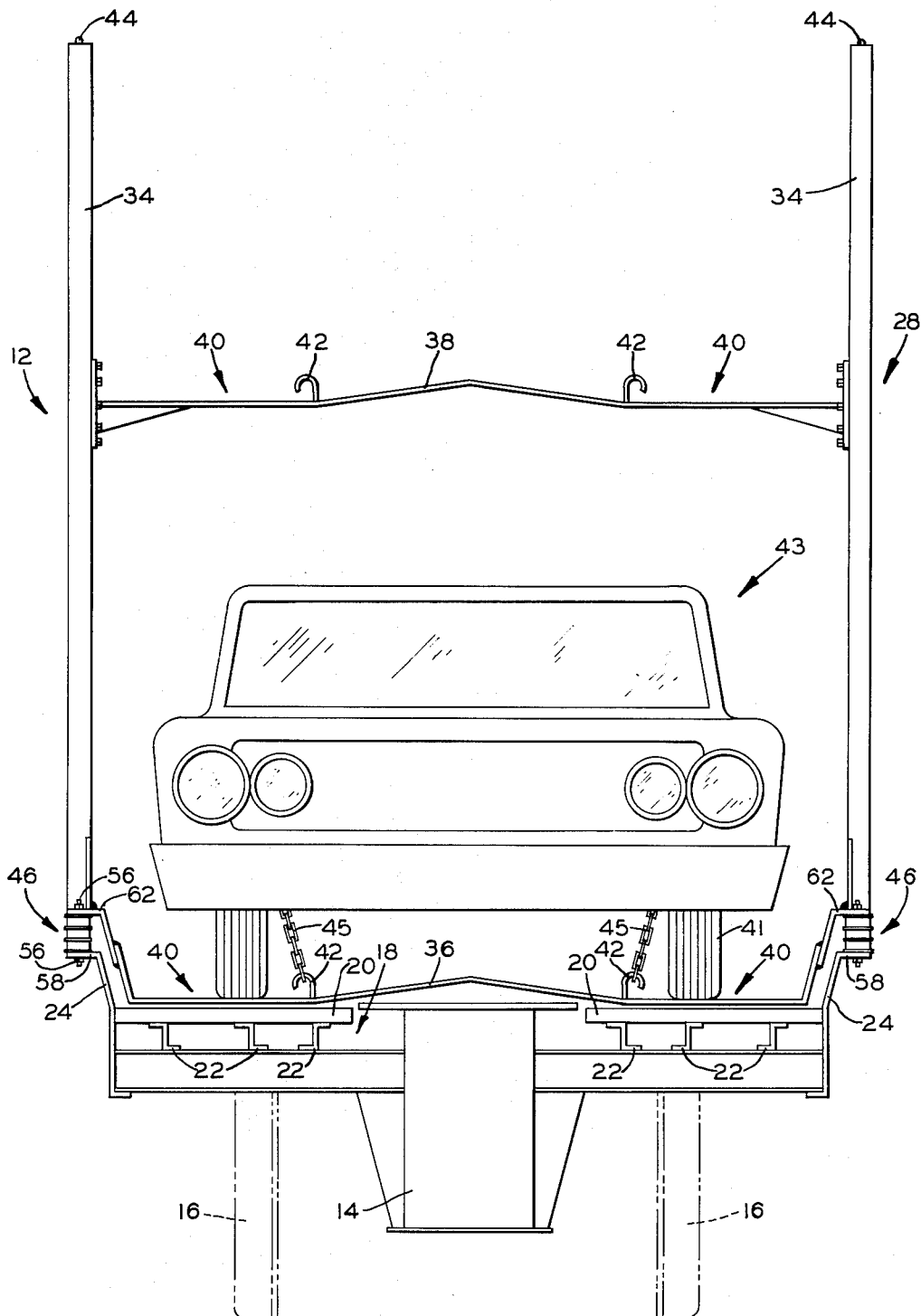
FIG. 2 is an enlarged end view of the device shown in FIG. 1.

Referring to the drawings and more particularly to FIGS. 1 and 2, a cargo carrier in the form of a railway car is shown generally at 10. A superstructure 12 is movably mounted on the car 10 by a plurality of cushion devices 46 and in this particular embodiment is of a type adapted to transport vehicles. The railway car 10 is provided with a longitudinally extending main frame 14 which is suitably supported for mobility by a plurality of railway wheels 16. A bed 18 is carried by the main frame 14 and includes a pair of longitudinally extending floor members 20 which are each connected to the main frame 14 by three longitudinally extending Z-section members 22, and a pair of enlarged longitudinally extending Z-section members 24 which are suitably attached to the sides of the main frame 14 and the floor members 20 and extend upwardly therefrom.

The superstructure 12 is composed of a plurality of aligned sections 26, 28, 30 and 32, which are sufficiently similar so that only one will be explained in detail. Each section includes three pairs of vertically extending longitudinally spaced side posts 34 of channel-shaped cross section. The side posts 34 of each pair are disposed on opposite sides of the railway car and the side posts on the same side of the car are interconnected by top rails 44. Two vertically spaced longitudinally extending deck members 36 and 38 are connected by suitable means to the oppositely positioned side posts 34 of each section as clearly shown in FIG. 2. The deck members 36 and 38 are each provided with a pair of transversely spaced longitudinally extending wheel track portions 40 and a suitable vehicle tie-down means 42. A plurality of wheels 41 of a vehicle shown generally at 43 are positioned on the track portions 40 and the vehicle is attached by a plurality of cables 45 to the tie-down means 42 so that it is fixedly secured relative to the superstructure 12.

Figure 3:
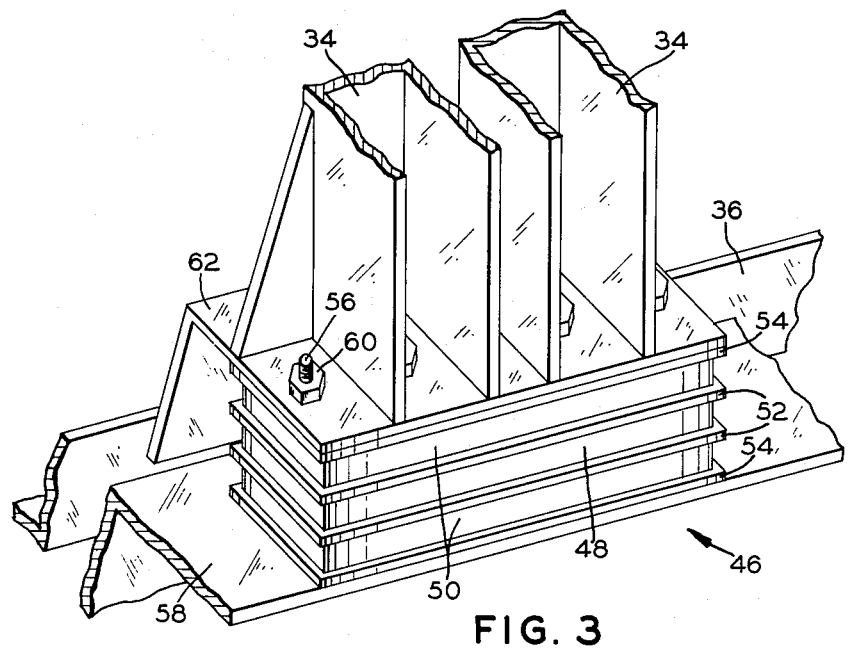
FIG. 3 is an enlarged isometric view of a cushion-bracket assembly joining adjacent sections of the railway car superstructure.

According to the present invention, the superstructure 12 is resiliently mounted on the car 10. More particularly, as shown in FIGS. 1 and 2, positioned between each side post 34 and the main frame 14 of the car 10 is a resilient cushion device 46 which total eighteen in all. The adjacent side posts 34 of the aligned sections 26, 28, 30 and 32 are connected to common mounting bracket 62 which in turn is secured to a common cushion device 46 as clearly shown in FIG. 3.

Referring to FIG. 4, the cushion device 46, appearing in elevation, comprises three elongated rubber, rubberlike, or elastomeric elements (an inner element 48 and two outer elements 50) each provided with a pair of parallel faces. The intermediate element 48 is bonded at both of its faces to the inner faces of a pair of separating plates 52. The outer elements 50 are each bonded at their inner face to the outer face of one of the separating plates 52 and further are each bonded at their outer face to one of a pair of mounting plates 54. The mounting plates 54 are provided with a plurality of studs 56 for securing the cushioning devices 46 to the superstructure 12 and the railway car 10. The number and size of the elastomeric elements 48 and 50 is determined by the characteristics of the material employed and the operational requirements of the cushioning devices 46.

As shown in FIG. 2, the Z-members 24 attached to the main frame 14 have a horizontally extending flange portion 58 which abuttingly engages the lower mounting plates 54 of the cushioning devices 46 and is fixedly attached thereto by means of nuts 60 threadedly engaging the studs 56. The superstructure 12 is provided with a plurality of mounting brackets 62 which are disposed in substantially parallel spaced relationship relative to the flanges 58. The mounting brackets 62 abuttingly engage the upper mounting plates 54 of the cushion devices 46 and are fixedly attached thereto by means of nuts 60 threadedly engaging the upper studs 56. As shown in FIG. 2, the mounting brackets 62 are fixedly attached to the side posts 34 as by welds so that the superstructure 12 is resiliently mounted by the cushioning devices 46.

In the embodiment shown in FIGS. 1 and 2, the superstructure 12 is solely supported against movement relative to the railway car 10 by the cushion devices 46. Any relative component of movement in a horizontal plane will result in shear type deformation of the elements 48 and 50. Longitudinal shock loads in the horizontal plane are the most common and most violent type of loads encountered. Since the cushion devices 46 will resist, cushion, and dampen such loads by acting in shear, the devices are being utilized to their best efficiency. Normally, the second most severe shock loads occur in a lateral direction, and result in lateral relative movement between the superstructure 12 and the railway car 10 which component of movement also will be cushioned by the devices 46 acting in shear. It is also apparent that the superstructure 12 floats on a resilient cushion so that it is isolated from vertical juggling forces by means of the cushion devices 46 acting in compression and tension. Since there is no direct engagement between the relatively movable superstructure 12 and car 10 there are no mechanical frictional forces to interfere with the cushioning, or to prevent recentering of the displaced members by the cushioning devices 46. Therefore, no cushion preload is necessary as in the prior art devices and small longitudinal shocks which are associated with overcoming preload forces are eliminated. In addition, since the cushion devices 46 are not preloaded their characteristics will change less with time than the prior art compression devices. Furthermore, the resilient cushions of this invention provide far superior dampening characteristics than the prior art compression cushion devices.

FIGS. 5 and 6 illustrate other embodiments of this invention wherein additional supporting means are interposed between the superstructure 12 and the car 10. In these embodiments, cushion devices 46 can be positioned in fewer locations between the relatively movable members 10 and 12 since the vertical loading is accommodated by other means. FIG. 5 discloses a skid means 64 attached to the lower deck 36 of the superstructure 12, which skid slidingly engages the floor members 20 of of the car 10. In this manner the movable members slidingly engage each other while being resiliently connected by the cushion devices 46 as previously described.

In the embodiment shown in FIG. 6, the lower deck 36 of the superstructure 12 is provided with roller assemblies 66 which rollingly engage the floor members 20 of the car 10. In this manner the movable members 10 and 12 rollingly engage each other while being resiliently connected by the cushion devices 46 as previously described.

The embodiment shown in FIG. 7 may be utilized to obtain different shock resisting characteristics. In this embodiment, the main frame 14 has a vertically extending L-sectioned member 68 fixedly attached thereto. A plurality of cushion devices 46 are disposed horizontally and the mounting plates 54 on one side thereof abuttingly engage a lateral side of the member 68. The cushion devices 46 are fixedly attached to the member 68 by means of a plurality of nuts 60 threadedly engaging the studs 56. A plurality of brackets 62 on the superstructure 12 are disposed in parallel spaced relationship relative to the member 68 and abuttingly engage the other mounting plates 54 of the cushion devices 46 and are fixedly attached thereto by means of a plurality of nuts 60 threadedly engaging the studs 56. With this arrangement, longitudinal and vertical loads are cushioned by the devices 46 acting in shear and lateral loads are cushioned by the devices acting in tension and compression. This arrangement would be utilized where greater vertical than lateral cushioning is desired.

Figure 8:
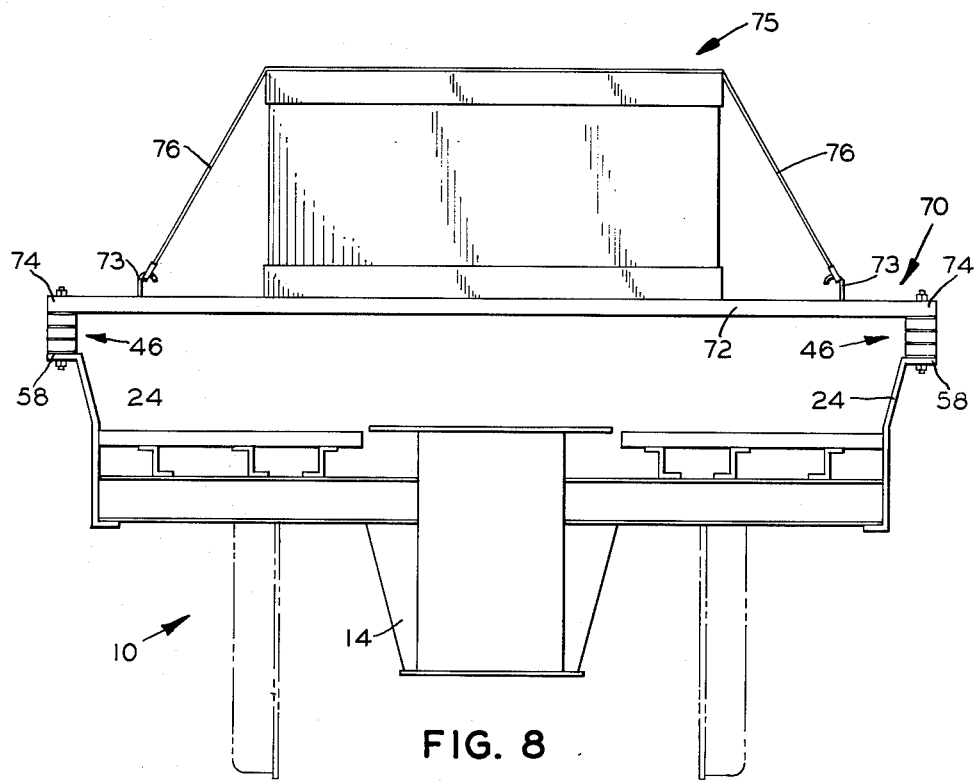
FIG. 8 is an end elevational view of a device embodying this invention which includes a railway car having a bulk goods transport superstructure mounted thereon.

Referring now to FIG. 8 wherein a superstructure of the type adapted to transport bulk goods is shown generally at 70. The superstructure 70 takes the form of a longitudinally extending substantially horizontal platform 72 having a plurality of tie-down means 73 provided thereon. The lateral edges 74 of the platform 72 engage the upper mounting plates 54 of the cushion devices 46 and are fixedly attached thereto by means of nuts 60 threadedly engaging studs 56. The railway car 10 and attachment thereto of the cushioning devices 46 have been previously explained in relation to FIG. 1 and such explanation is applicable here.

Items of bulk goods shown generally at 75 are positioned on the platform 72 and securely mounted thereon by means of a cable 76 tightly embracing the same and attached to the tie-down means 73. With this arrangement, longitudinal and lateral loads are cushioned by the devices 46 acting in shear while vertical loads are cushioned by the devices acting in compression and tension.

The embodiments of this invention as shown in FIGS. 5, 6 and 7 may also be utilized with the platform type of superstructure 70 to obtain the desired degree and type of cushioning.

From the foregoing it is apparent that a device has been described including a superstructure mounted on a cargo carrier wherein impact loads to the superstructure are adequately cushioned; wherein the means for mounting the superstructure to the cargo carrier includes a resilient means acting in shear to cushion longitudinal shock load components; wherein said resilient means will cushion vertical load components in addition to longitudinal loads, wherein a superstructure is movably mounted on a cargo carrier by resilient means which will accommodate relative components of movement therebetween in two directions by acting in shear so that shock loads to the superstructure are cushioned.

The preferred embodiments of this invention have been shown and described, but changes and modifications can be made, and it is understood that the foregoing description is illustrative only and not for the purpose of rendering this invention limited to the details illustrated or described except insofar as they have been limited by the terms of the following claims.

What is claimed is:

1. A transporting device adapted to carry a plurality of vehicles thereon comprising in combination, a railway car having a longitudinally elongated and laterally extending frame, a plurality of aligned longitudinally and laterally extending structural sections being superimposed relative to said frame and spaced vertically about the same, each of said structural sections comprising a plurality of laterally and longitudinally spaced vertically extending side posts and longitudinally and laterally extending vehicle supporting deck means interconnecting said side posts, a mounting means carried by the lower end of each of said side posts and having a lower face extending in a substantially horizontal plane, each structural section of said plurality of structural sections having a side post in juxtaposed paired relationship with a side post of the adjacent structural sections, a plurality of mounting means carried by said frame with one mounting means of said plurality of mounting means having an upper face disposed in parallel vertically spaced cooperating relationship with the lower face of the mounting means of each of said juxtaposed paired side posts and one mounting means of said plurality of mounting means disposed in parallel vertically spaced cooperating relationship with the lower face of the mounting means of each of the other of said side posts, a resilient cushioning means including a shear type elastomeric element interconnecting the faces of said cooperating mounting means and operative to accommodate the relative lateral and longitudinal components of movement between said frame and said structural sections by deforming in shear and operative to accommodate the relative vertical components of movement between said structural sections and said frame by deforming in tension and compression, whereby said structural sections are operative to move independently relative to said frame.

2. A transporting device adapted to carry a plurality of vehicles thereon comprising in combination, a railway car having a longitudinally elongated and laterally extending frame, a plurality of aligned structural sections being spaced vertically above and superimposed relative to said frame, each of said structural sections comprising a plurality of laterally and longitudinally spaced vertically extending side posts and longitudinally and laterally extending vehicle supporting deck means interconnecting said side posts, a mounting means carried by the lower end of each of said side posts and having a lower face extending in a substantially horizontal plane, each structural section of said plurality of structural sections having a side post in juxtaposed paired relationship with a side post of the adjacent structural section, a plurality of mounting means carried by said frame with one mounting means of said plurality of mounting means having an upper face disposed in parallel vertically spaced cooperating relationship with the lower face of the mounting means of each of said juxtaposed paired side posts and one mounting means of said plurality of mounting means disposed in parallel vertically spaced cooperating relationship with the lower face of the mounting means of each of the other of said side posts, a resilient cushioning means including an elastomeric element providing the sole connection between the faces of said cooperating mounting means and operative to accommodate the relative lateral and longitudinal components of movement between said frame and said structural sections by deforming solely in shear and operative to accommodate the relative vertical components of movement between said structural sections and said frame by deforming in tension and compression, whereby said structural sections are operative to move independently relative to said frame while being resiliently supported relative thereto solely by said resilient cushioning means.

References Cited by the Examiner

UNITED STATES PATENTS

| | | | |
|---|---|---|---|
| 1,887,325 | 11/32 | Pratt et al. | 296—1 |
| 2,047,955 | 7/36 | Fitch | 105—454 |
| 2,728,305 | 12/55 | Candlin | 105—454 |
| 2,792,231 | 5/57 | Compton | 105—362 |
| 2,828,957 | 4/58 | Hirst | 248—10 |
| 2,834,631 | 5/58 | Taraldsen | 296—1 |
| 2,873,693 | 2/59 | Chapman et al. | 105—368 |
| 2,929,339 | 3/60 | Schueder et al. | 105—368 |
| 2,977,899 | 4/61 | Doherty et al. | 105—36 |
| 3,003,436 | 10/61 | Peterson | 105—454 |
| 3,026,820 | 3/62 | Stough | 105—36 |
| 3,081,715 | 3/63 | Moorhead et al. | 105—368 |

OTHER REFERENCES

"ACF Cushioned Auto Racks," disclosed and illustrated on page 28 of the Dec. 5, 1960, Railway Age.

Article in Railway Age, Feb. 15, 1960, page 23, "What's New in Rolling Stock."

MILTON BUCHLER, *Primary Examiner.*

LEO QUACKENBUSH, *Examiner.*